(12) United States Patent
Um et al.

(10) Patent No.: US 9,814,093 B2
(45) Date of Patent: Nov. 7, 2017

(54) DATA FRAME STRUCTURE AND OPERATION METHOD FOR SHARING UNLICENSED SPECTRUM IN WIRELESS COMMUNICATION SYSTEM AND APPARATUS THEREOF

(71) Applicant: Electronics and Telecommunications Research Institute, Daejeon (KR)

(72) Inventors: Jung Sun Um, Daejeon (KR); Hoi Yoon Jung, Daejeon (KR); Byung Jang Jeong, Daejeon (KR); Sung Jin Yoo, Daejeon (KR); Jae Ick Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 14/597,482

(22) Filed: Jan. 15, 2015

(65) Prior Publication Data
US 2015/0201431 A1    Jul. 16, 2015

(30) Foreign Application Priority Data

Jan. 15, 2014  (KR) .................. 10-2014-0005012
Jul. 7, 2014   (KR) .................. 10-2014-0084381

(51) Int. Cl.
    *H04L 5/14*   (2006.01)
    *H04W 84/12*  (2009.01)
    *H04B 7/26*   (2006.01)
    *H04W 16/14*  (2009.01)
    *H04L 5/00*   (2006.01)
    *H04W 56/00*  (2009.01)

(52) U.S. Cl.
    CPC .......... *H04W 84/12* (2013.01); *H04B 7/2656* (2013.01); *H04L 5/0048* (2013.01); *H04L 5/14* (2013.01); *H04W 16/14* (2013.01); *H04W 56/001* (2013.01)

(58) Field of Classification Search
    CPC ... H04W 5/0048; H04W 16/14; H04W 84/12; H04W 56/001; H04W 72/1263; H04L 5/14; H04B 7/2656
    See application file for complete search history.

(56) References Cited

U.S. PATENT DOCUMENTS

2014/0044105 A1\*  2/2014  Bontu .................. H04L 5/001
                                                           370/336

\* cited by examiner

*Primary Examiner* — Noel Beharry
*Assistant Examiner* — Ruihua Zhang
(74) *Attorney, Agent, or Firm* — William Park & Associates Ltd.

(57) ABSTRACT

Provided are a data frame structure of a wireless communication system, which follows a sharing protocol which may be operated to coexist with a system that operates in an unlicensed spectrum, such as a WiFi system, and the like in the wireless communication system using a licensed spectrum such as an LTE system and an operation method of the system, and a terminal and a device of a base station for the operation.

18 Claims, 13 Drawing Sheets

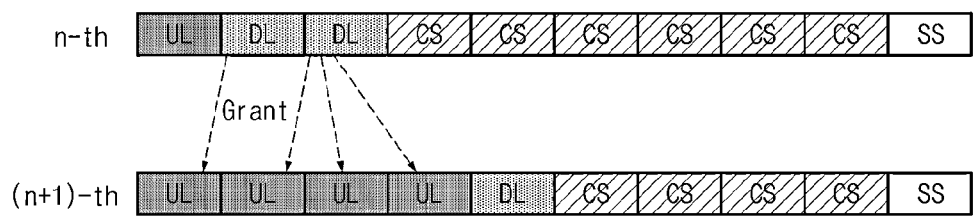
F I G. 6B

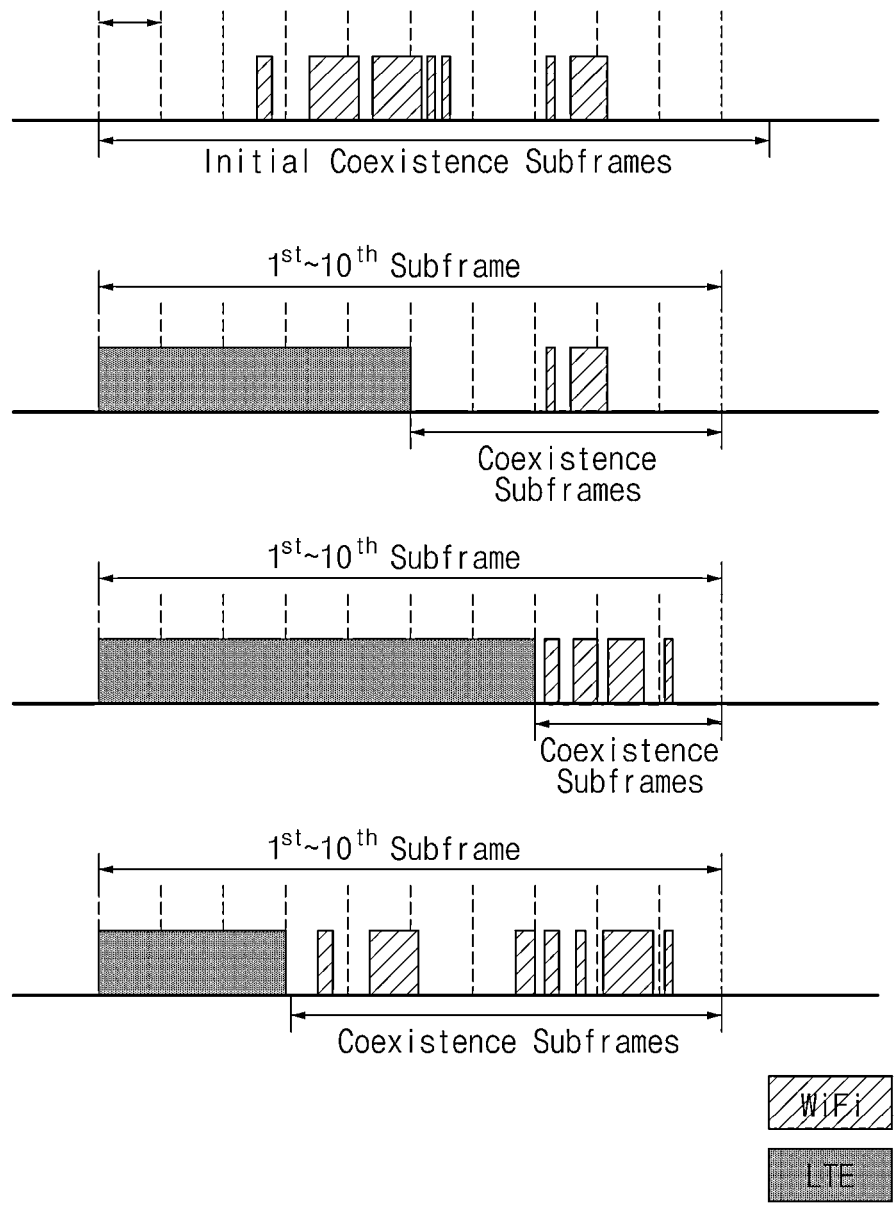
F I G. 7

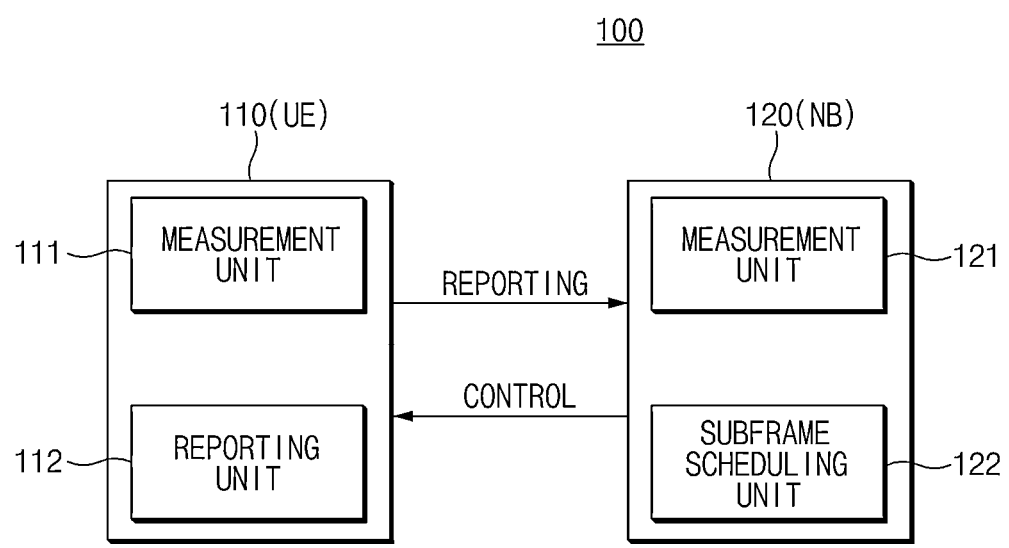
F I G. 8

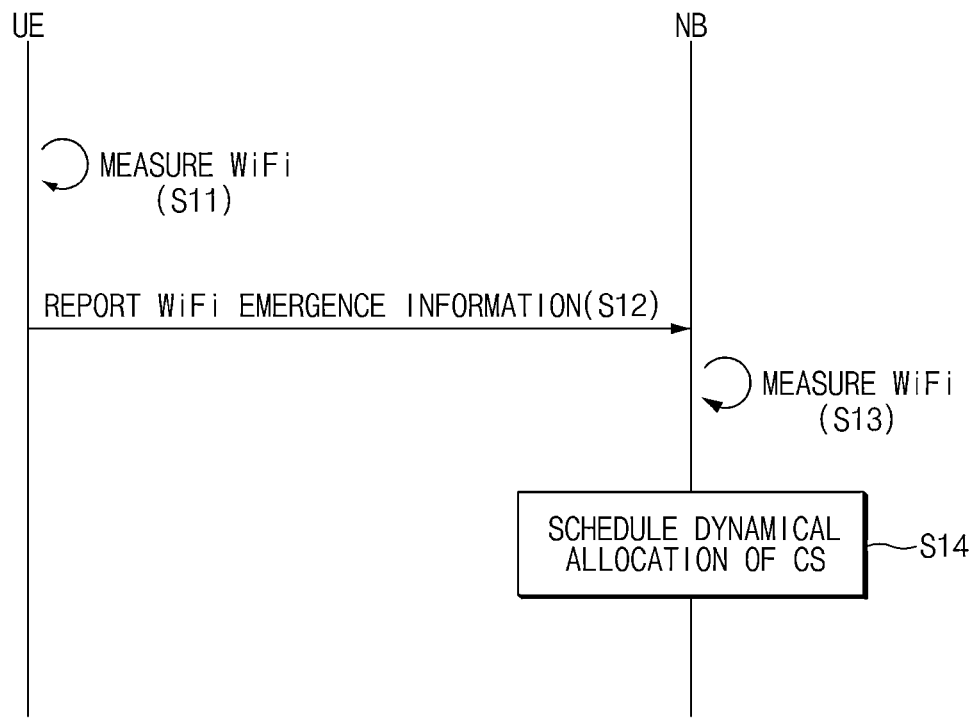
F I G. 9
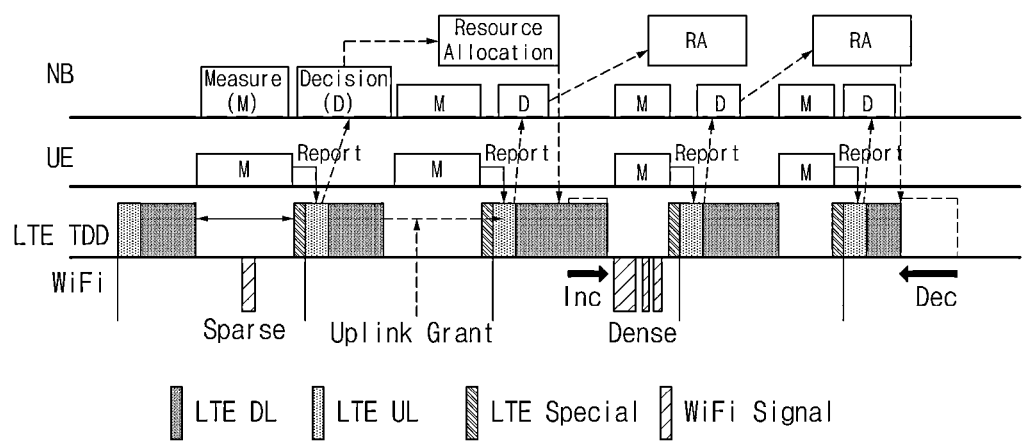
F I G. 10

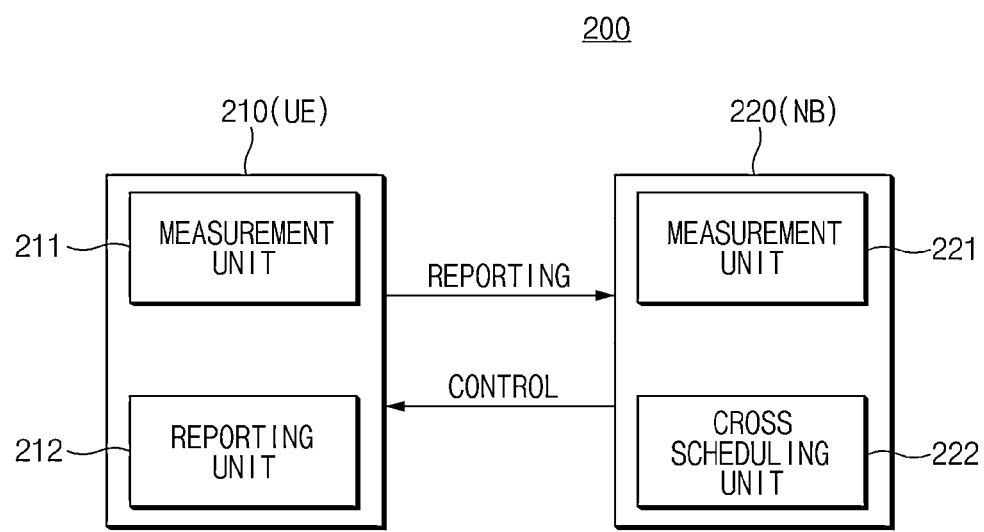
F I G. 14

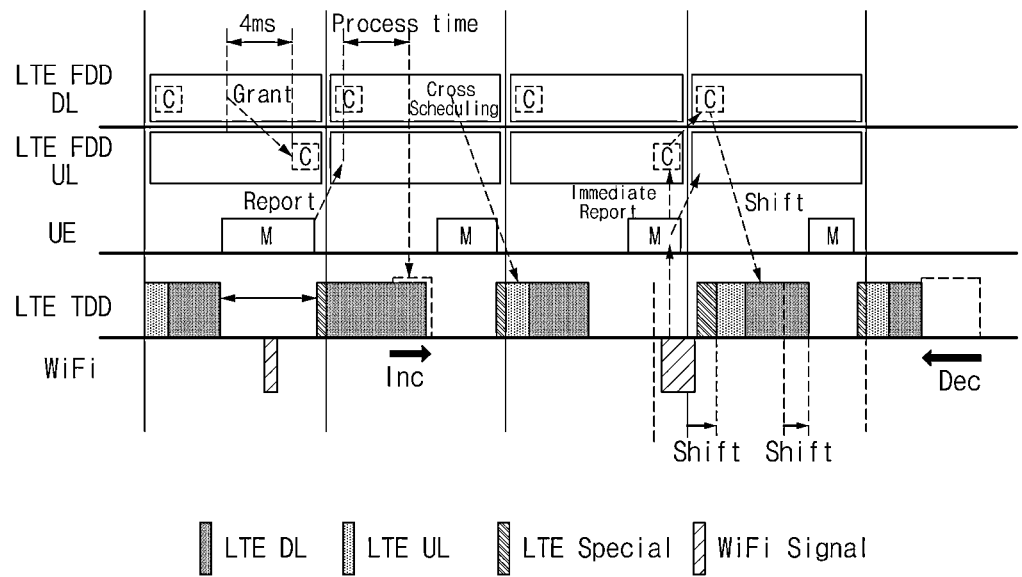
F I G. 16
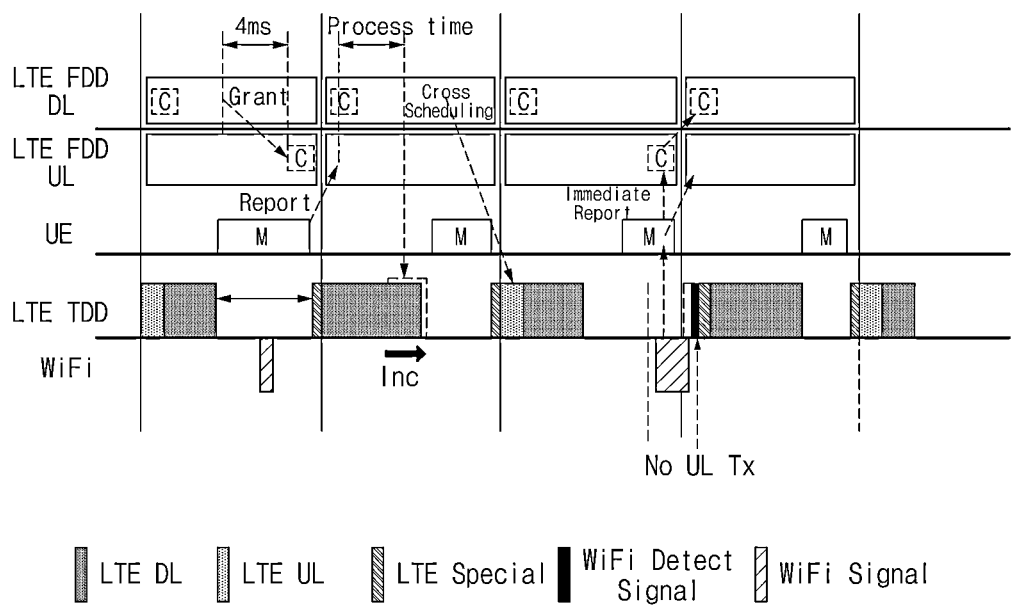
F I G. 17

DATA FRAME STRUCTURE AND OPERATION METHOD FOR SHARING UNLICENSED SPECTRUM IN WIRELESS COMMUNICATION SYSTEM AND APPARATUS THEREOF

CROSS-REFERENCE TO RELATED APPLICATIONS

This application claims priority to and the benefit of Korean Patent Application No. 10-2014-0005012 filed in the Korean Intellectual Property Office on Jan. 15, 2014, and Korean Patent Application No. 10-2014-0084381 filed in the Korean Intellectual Property Office on Jul. 7, 2014 the entire contents of which are incorporated herein by reference.

TECHNICAL FIELD

The present invention relates to a data frame structure and an operation method in a wireless communication system and an apparatus thereof, and particularly, to a data frame structure of a wireless communication system, which follows a sharing protocol which may be operated to coexist with a system that operates in an unlicensed spectrum, such as a WiFi system, and the like in the wireless communication system using a licensed spectrum such as an LTE system and an operation method of the system, and a terminal and a device of a base station for the operation.

BACKGROUND ART

In general, a mobile communication system operates in a licensed band in order to assure QoS of a user. In recent years, a 3GPP standard organization has started a discussion about the use of an unlicensed band (alternatively, spectrum) of a long term evolution (LTE) system.

A 2.4 GHz or 5 GHz band in the unlicensed band is dominantly used by a WiFi system. When the LTE system uses the unlicensed band, a resource allocation method and an interference avoidance function for the coexistence with the WiFi system should be considered. In the case of WiFi, a carrier sense multiple access (CSMA)/collision avoid (CA) method is used in order to access a radio resource. On the contrary, since a general LTE system gets a license (approval) for the band in advance, the general LTE system operates based on scheduling.

Under such an environment, in order for the wireless communication or mobile communication system using the licensed band, such as the LTE system to use the unlicensed band, a coexistence protocol that may be operated to coexist with a system that operates in the unlicensed band, such as the WiFi system, or the like is required.

SUMMARY OF THE INVENTION

The present invention has been made in an effort to provide a time division duplex (TDD) frame structure of communication data for being capable of coexisting with various heterogeneous systems (e.g., WiFi system) using an unlicensed band of an unpaired spectrum and an operation method such as resource allocation, and a terminal and a device of a base station for the operation, in a wireless communication system such as an LTE system using a licensed band of a paired spectrum.

The present invention has also been made in an effort to provide a method that can provide a high-quality wireless communication service through effective resource allocation by operating both a frequency division duplex (FDD) frame of a licensed band such as a general scheduling based LTE system and a time division duplex (TDD) frame of an unlicensed band such as a WiFi system, and a terminal and a device of a base station for the operation, in a wireless system such as an LTE system using the licensed band.

First, when the characteristics of the present invention are summarized, an exemplary embodiment of the present invention provides a frame structure of communication data in a wireless communication system for using an unlicensed band, including: any one or more of an uplink subframe (UL) zone or a downlink subframe (DL) zone; and a special subframe (SS) for channel estimation and synchronization, wherein the frame structure further includes a coexistence subframe (CS) for coexistence use with an unlicensed band system.

The wireless communication system may include an LTE system using a licensed band and the unlicensed band system may include a WiFi system.

The number of coexistence subframes (CSs) and the number of uplink subframes (ULs) or downlink subframes (DLs) may be flexibly allocated depending on resource occupation of the unlicensed band system.

The coexistence subframe (CS) is located ahead of the special subframe (SS) to use the special subframe (SS) as intervals of a downlink pilot time slot (DwPTS) in which a base station transmits no signal, a guard period (GP), and an uplink pilot time slot (UpPTS).

The UpPTS interval of the special subframe (SS) may be used to vary the length depending on existence of an unlicensed band signal or transmit an unlicensed band system detection signal, in addition to signal transmission for channel estimation and uplink synchronization to allow the unlicensed band system to determine that a resource is occupied depending on the variation of the length or the detection signal.

When the number of downlink subframes (DLs) is smaller than the number of uplink subframes (ULs) of a subsequent frame, grant may be made to a plurality of uplink subframes (ULs) of the subsequent frame by any one downlink subframe (DL).

Hybrid auto repeat request (HARQ) feedback may be made to the plurality of uplink subframes (ULs) in a bundling or multiple format in one downlink subframe (DL) of the subsequent frame corresponding to the plurality of uplink subframes (ULs).

When the number of downlink subframes (DLs) is larger than the number of uplink subframes (ULs) in the corresponding frame, the HARQ feedback may be made to the plurality of downlink subframes (DLs) of the previous frame in the bundling or multiple format by any one uplink subframe (UL).

Another exemplary embodiment of the present invention provides an unlicensed band coexistence method in a wireless communication terminal, the method comprising: transmitting data using a frame including a coexistence subframe (CS) zone for coexistence use with an unlicensed band system ahead of the special subframe (SS); detecting the unlicensed band system signal in the DwPTS and GP intervals of the special subframe (SS); and transmitting a UpPTS signal at a position of a corresponding special subframe (SS) moved to a subsequent subframe position, when the unlicensed band system stops the resource occupation in the DwPTS and GP intervals, after the detecting, wherein the UpPTS signal includes a sounding reference signal (SRS), a PHY random access channel (PRACH) signal, or the unlicensed band system detection signal, with a length of "natural number*symbol length+CP insertion length+α*Ts" by the sample unit (Ts) as sample unit time offset β*Ts, where α and β are 0 or the natural number.

When the unlicensed band system signal is continuously detected up to a subsequent subframe by starting ahead of a special subframe of a previous subframe, the unlicensed band system detection signal is transmitted in a sample data format determined by the sample unit (Ts) up to a remaining boundary time of the subsequent subframe.

Yet another exemplary embodiment of the present invention provides an unlicensed band coexistence method for data transmission and reception in a wireless communication system including: detecting, by a terminal, an unlicensed band signal during a coexistence subframe (CS) zone included in a data frame to report information on emergence of the unlicensed band signal to a base station; and dynamically allocating, by a base station that communicates with the terminal, shift of subframes of the data subframe or the number of subframes during a scheduling process, according to information on the emergence of the unlicensed band signal detected during the coexistence subframe (CS) zone interval of itself or information on the emergence of the unlicensed band signal reported by the terminal.

The reporting may include reporting the unlicensed band signal emergence information to the base station through the uplink subframe (UL) at a shifted position when the detection of the unlicensed band signal stops in addition to reduction of the coexistence subframe (CS) of a preallocated subsequent data frame or disregarding the uplink subframe (UL) and reporting the unlicensed band signal emergence information to the base station through a special subframe (SS) shifted to the position of the uplink subframe (UL).

The allocating may include recognizing and processing the shift of the uplink subframe (UL) or the downlink subframe (DL) of the data frame after the emergence of the unlicensed band signal and dynamically allocating the number of coexistence subframes (CSs), uplink subframes (ULs), or downlink subframes (DLs) of a subsequent data frame.

Still another exemplary embodiment of the present invention provides a device for sharing an unlicensed band of a wireless communication terminal including: a measurement unit measuring whether an unlicensed band signal emerges during a coexistence subframe (CS) zone interval included in a data frame; and a reporting unit reporting the unlicensed band signal emergence information to the base station through the uplink subframe (UL) at a shifted position when the detection of the unlicensed band signal stops in addition to reduction of the coexistence subframe (CS) of a preallocated subsequent data frame or disregarding the uplink subframe (UL) and reporting the unlicensed band signal emergence information to the base station through a special subframe (SS) shifted to the position of the uplink subframe (UL), depending on the detection of the unlicensed band signal in the measurement unit.

Still yet another exemplary embodiment of the present invention provides a device for sharing an unlicensed band of a base station including: a measurement unit measuring whether an unlicensed band signal emerges during a coexistence subframe (CS) zone interval included in a data frame; and a subframe scheduling unit deciding scheduling of a channel resource according to information on the emergence of the unlicensed band signal from the measurement unit or information on emergence of the unlicensed band signal reported from a wireless communication terminal that communicates with the base station, and recognizing and processing the shift of the uplink subframe (UL) or the downlink subframe (DL) of the data frame after the emergence of the unlicensed band signal and dynamically allocating the number of coexistence subframes (CSs), uplink subframes (ULs), or downlink subframes (DLs) of a subsequent data frame.

Still yet another exemplary embodiment of the present invention provides a method for sharing an unlicensed band in a wireless communication system that transmits and receives data by simultaneously operating different data frames including: detecting, by a terminal, an unlicensed band signal during a coexistence subframe (CS) zone interval included in a first data frame to report information on emergence of the unlicensed band signal to a base station through a coexistence resource (C) of an uplink frame of a second frame; and dynamically allocating, by a base station that communicates with the terminal, shift of subframes of the first subframe or the number of subframes during a scheduling process, according to information on the emergence of the unlicensed band signal detected during the coexistence subframe (CS) zone interval of itself or information on the emergence of the unlicensed band signal reported by the terminal.

In the reporting, the information on the emergence of the unlicensed band signal may be reported to the base station through the coexistence resource (C) of the uplink frame of the second frame at the time of a special subframe (SS) of the first frame, and the emergence of the unlicensed band signal may be broadcasted to the terminal through the coexistence resource (C) of the downlink frame of the second frame at a first subframe time of the downlink frame of the second frame.

The allocating may include immediately recognizing the shift of the uplink subframe (UL) or the downlink subframe (DL) in the first frame subsequent after the emergence of the unlicensed band signal and dynamically allocating the number of coexistence subframes (CSs), uplink subframes (ULs), or downlink subframes (DLs) of the corresponding first frame.

Still yet another exemplary embodiment of the present invention provides a device for sharing an unlicensed band in a wireless communication terminal that transmits and receives data by simultaneously operating different data frames including: a measurement unit measuring whether an unlicensed band signal emerges during a coexistence subframe (CS) zone interval included in a first frame; and a reporting unit reporting information on the emergence of the unlicensed band signal to a base station through a coexistence resource (C) of an uplink frame of a second frame at the time of a special subframe (SS) of the first frame or disregarding an uplink subframe (UL) of the first frame and reporting the unlicensed band signal emergence information to the base station through a first subframe resource in the special subframe (SS) shifted to the position of the uplink subframe (UL), depending on the detection of the unlicensed band signal in the measurement unit.

Still yet another exemplary embodiment of the present invention provides a device for sharing an unlicensed band in a base station that transmits and receives data by simultaneously operating different data frames including: a measurement unit measuring whether an unlicensed band signal emerges during a coexistence subframe (CS) zone interval included in a first frame; and a cross scheduling unit deciding scheduling of a channel resource according to information on the emergence of the unlicensed band signal from the measurement unit or information on emergence of the unlicensed band signal reported from a wireless communication terminal that communicates with the base station through a coexistence resource (C) of an uplink frame of a second frame, and immediately recognizing shift of an uplink subframe (UL) or a downlink subframe (DL) in a first frame subsequent after the emergence of the unlicensed band signal and dynamically allocating the number of coexistence subframes (CSs), uplink subframes (ULs), or downlink subframes (DLs) of the corresponding first frame.

As described above, according to a data frame structure and an operation method for sharing an unlicensed spectrum in a wireless communication system, and an apparatus thereof, the existing user can be maximally protected and fairness can be maintained according to a coexistence protocol so as to share an unlicensed band with various heterogeneous systems such as a WiFi system, and the like, in the wireless communication system such as an LTE system using a licensed band.

According to the present invention, in the wireless communication system such as the LTE system using the licensed band, signal interference with heterogeneous systems can be avoided and a high-quality communication service can be provided through effective resource allocation by operating both a frequency division duplex (FDD) frame of a licensed band and a time division duplex (TDD) frame of an unlicensed band such as the WiFi system.

BRIEF DESCRIPTION OF THE DRAWINGS

FIGS. 6A and 6B are diagrams illustrating exemplary embodiments of the UL grant when the number of downlink subframes (DLs) in the TDD frame is smaller than the number of uplink subframes (ULs) after the special subframe (SS) according to the exemplary embodiment of the present invention.

FIG. 7 is a diagram illustrating exemplary embodiments of dynamically the number of coexistence subframes (CSs) according to a WiFi signal frequency of the coexistence subframe zone (CS zone) in the TDD frame according to the exemplary embodiment of the present invention.

FIG. 8 is a diagram for describing a terminal (UE) and a base station (NB) of a wireless communication system using the TDD frame for sharing the unlicensed band according to the exemplary embodiment of the present invention.

FIG. 9 is a flowchart for describing an operation of the wireless communication system of FIG. 8.

FIG. 10 is a diagram for describing measurement of an unlicensed band signal and resource allocation of the terminal (UE) and the base station (NB) according to the present invention.

FIG. 14 is a diagram for describing a terminal (UE) and a base station (NB) according to another exemplary embodiment of the present invention for simultaneously operating licensed band FDD and unlicensed band TDD.

FIGS. 16 and 17 are diagrams for describing operating processes of the terminal (UE) and the base station (NB) depending on simultaneous operation of the licensed band FDD and the unlicensed band TDD in the wireless communication system of FIG. 13.

DETAILED DESCRIPTION

Figure 1A:
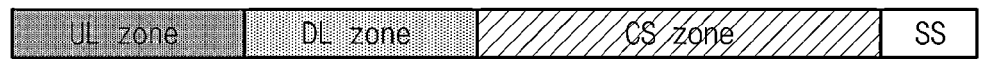
FIG. 1A is a diagram illustrating a basic structure of a TDD frame of a wireless communication system for coexistence of an unlicensed band according to an exemplary embodiment of the present invention.

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described in priority and a description of elements which may obscure the spirit of the present invention will be skipped. Further, some components of the drawings may be enlarged, omitted, or schematically illustrated. An actual size is not fully reflected on the size of each component and therefore, contents disclosed herein are not limited by relative sizes or intervals of the components drawn in the respective drawings.

First, as described below, in the present invention, in a wireless communication (alternatively, mobile communication) system (hereinafter, referred to as a licensed band system) such as an LTE system, a resource of an unlicensed band is shared with various heterogeneous systems (hereinafter, referred to as an unlicensed band system) using the unlicensed band, such as a WiFi system, or the like, however, the resource appropriately allocated by flexible temporal division to effectively coexist with the heterogeneous systems and maintain a high-quality communication service. Further, a method that occupies the resource by dynamically monitoring, such as listen-before-talk (LBT) may be considered, but the present invention presents a method that can apply even a base station (NB, Node-B) centric scheduling scheme for a licensed band together by using a basic frame element of the existing licensed band system (e.g., LTE system) for an unlicensed band coexistence protocol.

To this end, in the licensed band system (e.g., LTE system) depending on the unlicensed band coexistence protocol of the present invention, by considering an emergence frequency of a signal (e.g., WiFi signal) of the unlicensed band system, when the signal of the unlicensed band system emerges at a frequency of a predetermined threshold value, shift may be made to another channel in the unlicensed band using the unlicensed band may stop and an influence on the unlicensed band system is minimized by protecting the constructed unlicensed band system (e.g., WiFi system) as possible.

FIG. 1A is a diagram illustrating a basic structure of a TDD frame of a wireless communication system for coexistence of an unlicensed band according to an exemplary embodiment of the present invention.

Referring to FIG. 1A, a TDD frame structure (alternatively, a structure such as a predetermined recording medium) of communication data loaded on a signal or a packet which may be used in the wireless communication system according to the exemplary embodiment includes subframe zones or subframes having four purposes such as a uplink subframe zone (UL zone), a downlink subframe zone (DL zone), a coexistence subframe zone (CS zone), and a special subframe (SS).

The TDD frame structure of the wireless communication system according to the exemplary embodiment of the present invention is different from a structure constituted only by an uplink subframe U and a downlink subframe D between the special subframes in a TDD frame of a general unlicensed band such as a WiFi system as shown in [Table 1] given below.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 1B:
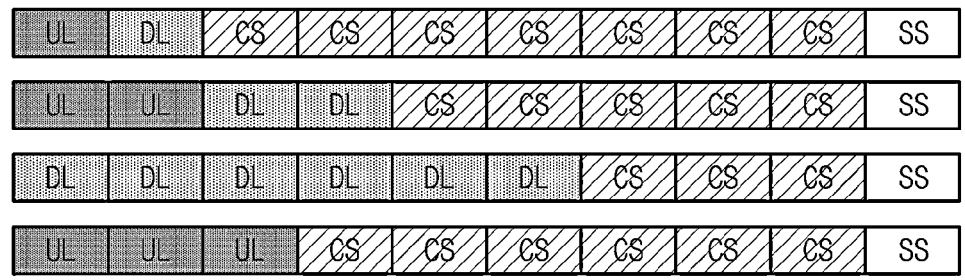
FIG. 1B is a diagram illustrating various exemplary embodiments of a TDD frame structure of FIG. 1A.

In the TDD frame structure of the wireless communication system according to the exemplary embodiment of the present invention, which is illustrated in FIG. 1A, the position of the subframe zone or the subframe may be changed and frames may be arranged and transmitted/received in all combinationable orders such as (DL zone, CS zone, SS, UL zone), (CS zone, SS, UL zone, UL zone), (SS, UL zone, DL zone, CS zone), and the like in addition to an order such as (UL zone, DL zone, CS zone, SS) of FIG. 1. Further, as illustrated in FIG. 1B, any one of the UL zone and the DL zone may not be used.

In the TDD frame (e.g., each 10 msec) structure of the present invention, the respective subframe zones may include a plurality of subframes having a similar purpose as illustrated in FIG. 1B. For example, between the special subframes (SS) (e.g., 1 msec), the UL zone may include one or two or more corresponding uplink subframes ULs) (e.g., each 1 msec), the DL zone may include one or two or more corresponding downlink subframes (DLs) (e.g., each 1 msec), and the CS zone may include one or more corresponding coexistence subframes (CSs) (e.g., each 1 msec).

In the present invention, any one of the UL zone and the DL zone may not be used and in this case, as illustrated in FIG. 1B, the frame may be configured in a form such as (DL zone, CS zone, SS) or (UL zone, CS zone, SS). For example, when the DL zone is not used and only the UL zone exists in the TDD frame, carrier aggregation (CA) or frequency aggregation is considered and it is assumed that an uplink resource is granted through cross-scheduling in another component carrier (CC) (carrier frequency band) (e.g., DL of FDD) is included.

Figure 1C:
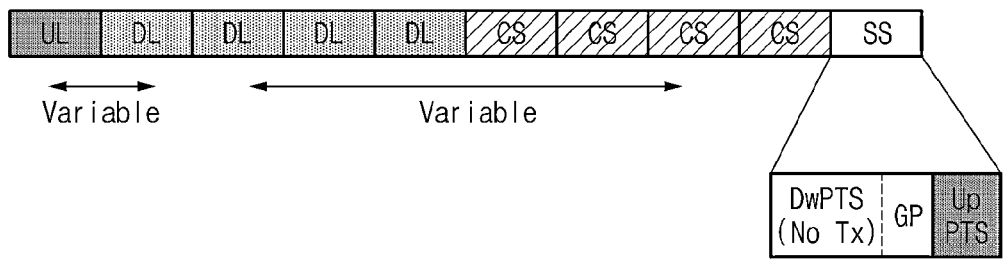
FIG. 1C is a diagram illustrating, in more detail, the structure of the TDD frame of the wireless communication system for coexistence of the unlicensed band according to the exemplary embodiment of the present invention.

FIG. 1C is a diagram illustrating, in more detail, the structure of the TDD frame of the wireless communication system for coexistence of the unlicensed band according to the exemplary embodiment of the present invention.

Figure 2:
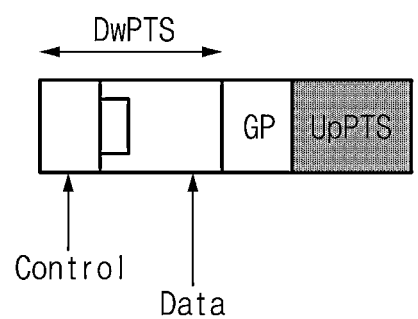
FIG. 2 is a diagram illustrating a special subframe (SS) of a general TDD system.

As illustrated in FIG. 1C, in the wireless communication system of the present invention, both an unlicensed band system and a resource of the unlicensed are used, however, as described below, the number of the coexistence subframes (CSs) is flexibly granted according to occupation of the resource by the unlicensed band system between the special subframes (SSs) of the TDD frame, and as a result, the numbers of the uplink subframes (ULs) and the downlink subframes (ULs) are also flexibly granted to effectively coexist with another unlicensed band system. Further, the special subframe (SS) is constituted by a downlink pilot time slot (DwPTS), a guard period (GP), and an uplink pilot time slot (UpPTS). Herein, the downlink pilot time slot (DwPTS) may include a field for inserting a control signal and a field inserting data as illustrated in FIG. 2 similarly as in the frame of the general TDD system.

Figure 3A:
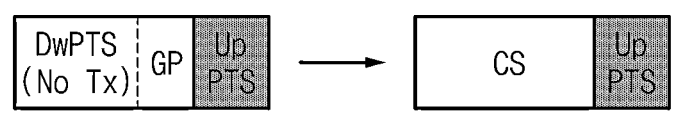
FIG. 3A is a diagram for describing a meaning of a special subframe (SS) of FIG. 1C.

However, in the frame of the existing LTE system, the downlink subframe exists ahead of the special subframe, and as a result, a downlink signal (e.g., control signal, data) may be transmitted to the DwPTS, but since the coexistence subframe (CS) exists ahead of the special subframe (SS) in the present invention, a base station (NB) transmits no signal to the DwPTS. That is, since the GP is an interval with no signal, the GP has the same meaning as an interval for the unlicensed band system such as the existing WiFi system, that is, an extension interval of the coexistence subframe (CS) during a 'DwPTS(No Tx)+GP' interval from the start of the special subframe (SS) up to the UpPTS as illustrated in FIG. 3.

Herein, in the case of the UpPTS, resources are configured in such a manner that one symbol or two symbols (e.g., single-carrier frequency division multiplexing (SCFDM) symbol) may be transmitted in the existing 3GPP standard, but in the present invention, one symbol may be used or two symbols may be used or increase to two or more symbols or increase integer times as many as Ts samples according to an operating situation of the unlicensed band signal such as existence of a WiFi signal and this is determined by a mobile terminal (UE) (the length of the UpPTS granted by the base station may be defined to be fixed to one or two symbols and the length of a signal actually transmitted by the terminal may be varied. As a result, in the present invention, it will be described that the length of the UpPTS is varied for easy description). Herein, the symbol is a concept of "fast Fourier transform (FFT) length+cyclic prefix (CP) insertion length". For example, the FFT length is 2048 Ts, and the CP insertion length may be 144 Ts, 160 Ts, 512 Ts, or 1024 Ts according to a type of a downlink control information (DCI) format. For example, according to format 4, the CP insertion length is 144 Ts. Herein, Ts as an LTE basic sample unit may be $1/(15 \text{ k}*2048)$ sec. As described above, in the present invention, the length of the UpPTS may be used as integer-times symbols (alternatively, a natural number*FFT length) and besides, the corresponding signal may be transmitted based on the sample unit (Ts) with a signal transmission time and a length in the UpPTS. For example, the length of the UpPTS may be "natural number*symbol length+variable CP insertion length". That is, the variable CP insertion length may be "CP insertion length (e.g., 144 Ts)+$\alpha$*Ts".

Herein, a is 0 or the natural number. Alternatively, the signal having the length may be transmitted with a transmission time having time offset of β*Ts. Herein, β is 0 or the natural number, and β*Ts is a time offset value of the Ts unit added to the transmission time of the symbol transmitted to the existing UpPTS according to an existence situation of the unlicensed signal.

In the present invention, the UpPTS may be used for purposes of sounding reference signal (SRS) for estimating (checking) an uplink channel state and transmission of a PHY random access channel (PRACH) signal for uplink synchronization, and besides, as described below, the UpPTS may be further used to transmit a predetermined signal (e.g., a WiFi detection signal) ahead so that the signal of the uplink subframe (UL) or the downlink subframe (DL) to be transmitted after the special subframe (SS) may be transmitted and received without interference. In other words, as the PRACH or SRS signal is transmitted in the UpPTS interval determined by the sample unit (Ts) at the determination time as the sample unit (Ts) by using the UpPTS in which the length may be variably determined according to various purposes or a signal (e.g., WiFi detection signal) of a predetermined sample (e.g., 2048 Ts, and the like) determined by the sample unit (Ts) in the UpPTS interval is transmitted, the UpPTS may be used so that the unlicensed band system such as the WiFi system determines that a channel resource or medium is occupied.

Although described in detail in describing FIGS. 11 and 12, but a scenario in which the UpPTS increases will be described below in more detail.

Figure 3B:
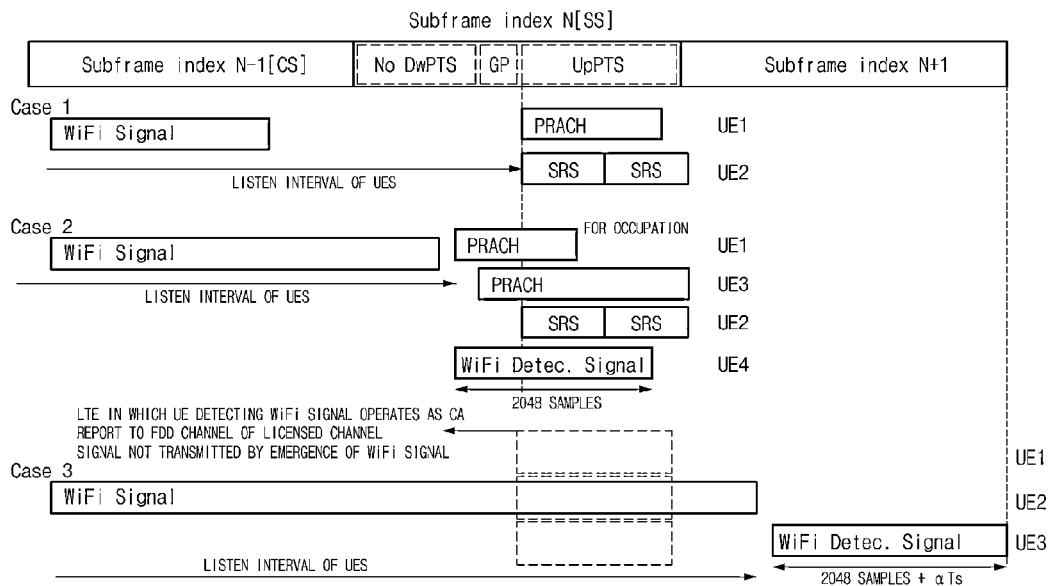
FIG. 3B is a diagram for describing the length of UpPTS decided by the sample unit (Ts) and utilization thereof according to the present invention.

Basically, the terminal (UE) may transmit the UpPTS (e.g., the PRACH or SRS signal) of the special subframe (SS) granted fixedly in advance (see case 1 of FIG. 3B).

However, in the present invention, besides, when the terminal (UE) detects the WiFi signal by the sample unit (Ts) during the 'DwPTS(No Tx)+GP' interval in the special subframe (SS) and senses that the WiFi signal is not transmitted, the UpPTS is not transmitted at the (position of the corresponding designated special subframe (SS) and when the WiFi system stops resource occupation, the UpPTS (e.g., the PRACH or SRS signal) may be transmitted at the time determined by the sample unit (Ts) in the special subframe (SS) moved to a subsequent subframe position (see case2 of FIG. 3B). In this case, since the UpPTS is transmitted from a just subsequent symbol position when the WiFi signal is not to be transmitted, the UpPTS may be transmitted during two or more symbol intervals of the sample unit (Ts) as necessary. That is, the terminal (UE) may repeatedly transmit the SRS or PRACH signal as the UpPTS signal during two or more symbol intervals. In addition to the method for transmitting the UpPTS during two or more symbol intervals by moving the UpPTS, the terminal (UE) that detects the WiFi signal may transmit a signal (WiFi detection signal) for indicating detection of the WiFi signal to the base station (NB) in a predetermined sample (e.g., 2048 Ts) data format determined by the sample unit (Ts) (see UE4 of case2 of FIG. 3B). It is notified to the WiFi system that the channel resource is occupied by the wireless communication system such as the LTE system of the present invention through such a method, and as a result, the WiFi system determines that the channel resource is occupied to be in a standby state and the wireless communication system such as the LTE system of the present invention may occupy the resource in the uplink subframe (UL) or the downlink subframe (DL) of the corresponding frame.

As described in case3 of FIG. 3B, when the WiFi signal is continuously detected up to a subsequent subframe (N+1) by starting ahead of the special subframe (SS) of the previous subframe (N), the terminals (UEs) may notify the detection of the WiFi signal to the base station (NB) by using the channel of the licensed band in the corresponding special subframe (SS). In this case, the terminals (UEs) sensing that the WiFi signal is not transmitted in the middle of the subsequent subframe (N+1) may transmit the WiFi detection signal for indicating the detection of the WiFi signal to the base station (NB) in a sample (e.g., 2048 Ts+α*Ts) data format determined by the sample unit (Ts) at a remaining boundary time of the subsequent subframe (N+1) as the UpPTS.

Next, referring to FIGS. 4 to 7, resource grant by the base station (NB) and an uplink subframe grant timing, and a hybrid auto repeat request (HARQ) timing rule will be described.

Herein, the case of self scheduling for a single carrier (alternatively, channel) of the unlicensed band is assumed and when in the case of cross carrier scheduling among a plurality of component carriers of the frequency division duplex (FDD) in the licensed band, an HARQ timing among the component carriers in not the unlicensed band but the licensed band is followed. However, the cross carrier scheduling scheme may be applied even between the carrier of the FDD and the carrier of the TDD.

Figure 4:
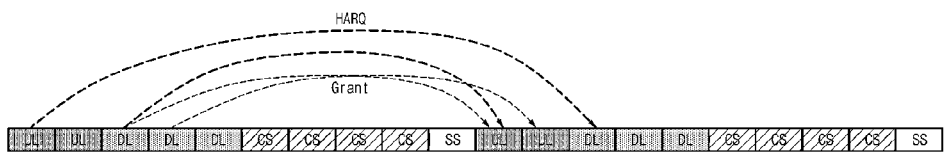
FIG. 4 is a diagram for describing resource allocation and HARQ in the TDD frame according to the exemplary embodiment of the present invention.
Figure 5:
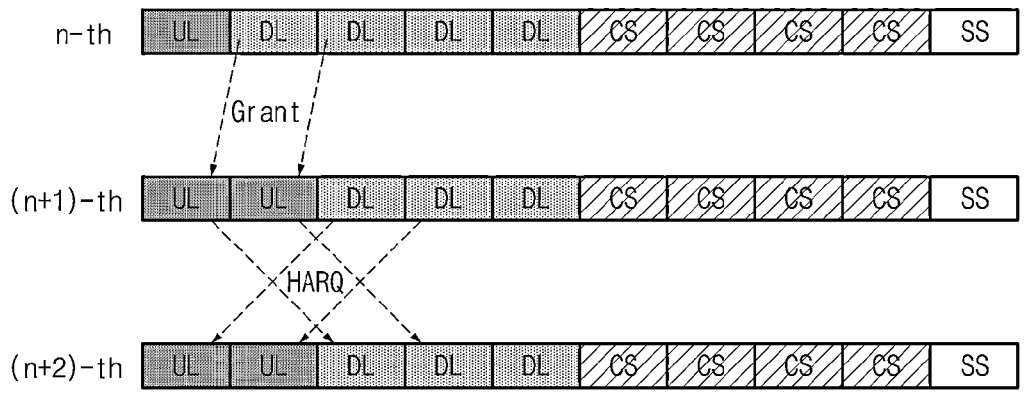
FIG. 5 is a diagram illustrating an exemplary embodiment UL grant and HARQ transmission when a frame is configured by assuming that the special subframe (SS) is transmitted to a fixed position according to the exemplary embodiment of the present invention.

First, the base station (NB) may allow a physical downlink shared channel (PDSCH) by a MCS (alternatively, or DCI) of a physical downlink control channel (PDCCH) of the corresponding subframe similarly to the related art as the resource of the downlink subframe (DL). Herein, the MCS represents a modulation and coding set and the DCI represents downlink control information. Further, in the case of the resource grant of the uplink subframe (UL), the DL (by the MCS (alternatively, DCI) of the previous frame first transmitted after the UL or SS grants an UL resource to be transmitted in a corresponding zone and a CS zone, and a frame after the SS and notifies the grant of the resource to the terminal (UE) as illustrated in FIGS. 4 and 5 (UL grant). Similarly, a second DL of the previous frame grants a second UL resource of the corresponding zone and the CS zone, and the frame after the SS.

That is, the resource of the uplink subframe (UL) of a subsequent frame is granted in the downlink subframe (DL) to be granted to the terminal and a HARQ feedback for the downlink subframe (DL) or the uplink subframe (UL) of the corresponding frame is transmitted to cross each other in the uplink subframe (UL) or the downlink subframe (DL) of the subsequent frame.

The terminal (UE) receives data from the base station (NB) through the downlink subframe (DL) granted as above, transmits data to the base station (NB) through the uplink subframe (UL) granted as above, and an ACK/NACK signal for notifying whether the data is successfully transmitted and received to the first DL or UL of the frame after the SS with respect to the first UL or DL of the previous frame as illustrated in FIGS. 4 and 5 as the HARQ feedback therefor. When the base station (NB) or the terminal (UE) receives the NACK signal, the base station (NB) or the terminal (UE) retransmits corresponding data by using the DL or UL in the frame according to a predetermined rule.

Figure 6A:
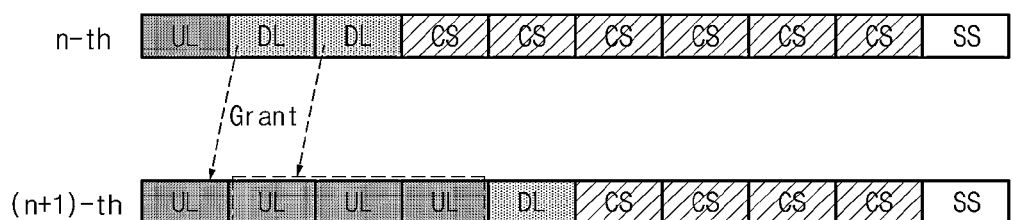

If the number of DLs of the previous frame is smaller than the number of ULs of the frame after the SS as illustrated in FIGS. 6A and 6B, UL grant may be granted according to the following rule.

(1) First, the base station (NB) may similarly notify a PDSCH grant position and the MCS (alternatively, DCI) to the terminal (UE) with respect to a plurality of remaining ULs in which the resource grant is required as illustrated in FIG. 6A through a last DL among the DLs of the previous frame.

(2) Alternatively, the base station (NB) may similarly notify respective different PDSCH grant positions and the MCS (alternatively, DCI) to the terminal (UE) with respect to the plurality of remaining ULs in which the resource grant is required as illustrated in FIG. 6A through the last DL among the DLs of the previous frame.

In the cases of (1) and (2), as the HARQ feedback, the ACK/NACK signal for the plurality of corresponding ULs may be all at once transmitted in a bundling or multiple format in one DL of the corresponding position of the subsequent frame. When the base station (NB) or the terminal (UE) receives the NACK signal, the base station (NB) or the terminal (UE) retransmits the corresponding data by using the DL or UL in the subsequent frame according to a predetermined rule.

Since there is a high possibility that the wireless communication system (e.g., LTE system) for sharing the unlicensed band according to the exemplary embodiment of the present invention will use the unlicensed band for a data offloading purpose, the number of DLs in each frame may be granted to be larger than the number of ULs. In this case, the HARQ feedback ACK/NACK may be transmitted in a bundling or multiple format of a plurality of DLs (e.g., see second and third DLs in (n+1)-th of FIG. 5) ahead of the SS in one UL (e.g., see second UL in (n+2)-th of FIG. 5) of the frame transmitted after the SS. When only one UL exists in the frame transmitted after the SS, the HARQ feedback ACK/NACK may be transmitted in a bundling or multiple format of all DLs ahead of the corresponding SS. The corresponding data for the DL may be retransmitted to earliest DL which may be transmitted after the NACK verified through the UL after the SS.

FIG. 7 is a diagram illustrating exemplary embodiments of dynamically controlling the number of coexistence subframes (CSs) according to a WiFi signal frequency of the coexistence subframe zone (CS zone) in the TDD frame according to the exemplary embodiment of the present invention.

In the wireless communication system using the TDD frame for sharing the unlicensed band of the present invention as illustrated in FIG. 7, the number of coexistence subframes (CSs) is dynamically controlled based on emergence information of an unlicensed band signal (e.g., WiFi signal) during the interval of the CS zone of the current frame, and as a result, the number of uplink subframes (ULs) or downlink subframes (DLs) may be flexibly granted.

For dynamic grant of the resource, FIG. 8 is a diagram for describing the terminal (UE) and the base station (NB) of the wireless communication system 100 using the TDD frame for sharing the unlicensed band according to the exemplary embodiment of the present invention. FIG. 9 is a flowchart for describing an operation of the wireless communication system 100 of FIG. 8.

Referring to FIG. 8, a device 110 for sharing the unlicensed band of the (mobile) terminal (UE) according to the exemplary embodiment of the present invention may include a measurement unit 111 and a reporting unit 112, and a device 120 for sharing the unlicensed band of the base station (NB) according to the exemplary embodiment of the present invention may include a measurement unit 121 and a subframe scheduling unit 122. Herein, the terminal (UE) includes mobile communication terminals including a smart phone, a tablet PC, a notebook, and the like and in some cases, may include a desktop PC, and includes all electronic devices using a wireless communication scheme for sharing the unlicensed band of the present invention, which include a PMP, a PDP, and the like. The base station (NB) relays communication between the terminals (UEs) on a network supporting the wireless communication scheme of the present invention. General components for supporting wireless communication of the terminal (UE) and the base station (NB) are not illustrated in FIG. 8 and only primary components are displayed and the respective components of the terminal (UE) or the base station (NB) may be implemented by hardware, software, or a combination thereof.

For example, as illustrated in FIG. 10, in order for the base station (NB) to dynamically control the resource in the TDD frame of the unlicensed band, the measurement unit 111 of the terminal (UE) measures whether WiFi emerges (alternatively, the unlicensed band signal emerges) during the interval of the CS zone (see S11 of FIG. 9) and when the WiFi signal is detected, the reporting unit 112 reports to the base station (NB) predetermined WiFi emergence information (unlicensed band signal emergence information) through the UL after the SS (see S12 of FIG. 9).

The measurement unit 121 of the base station (NB) measures whether the WiFi emerges during the interval of the CS zone of itself (see S13 of FIG. 9), and the subframe scheduling unit 122 decides, based on the WiFi emergence information by the measurement unit 121 thereof and the WiFi emergence information reported by the terminal (UE), scheduling suitable therefor, however, dynamically grants the number of coexistence subframes (CSs) to accordingly control data to be transmitted and received (see S14 of FIG. 9). That is, as illustrated in FIG. 10, the subframe scheduling unit 122 decreases the number of coexistence subframes (CSs) when the WiFi emerges less and increases the number of the uplink subframes (ULs), the downlink subframes (DLs), or both subframes, and when the WiFi emerges more, a resource allocation process of increasing the number of coexistence subframes (CSs) and increasing the number of the uplink subframes (ULs), the downlink subframes (DLs), or both subframes may be dynamically performed. The corresponding dynamic allocated resource is preferably scheduling-decided depending on the WiFi emergence information and thereafter, applied to the subsequent frame after the corresponding frame elapses (e.g., applied after approximately 10 msec) as illustrated in FIG. 10. As a result, the base station (NB) may transmit data to the terminal (UE) in the downlink subframe (DL) and the terminal (UE) may transmit data to the base station (NB) in the uplink subframe (UL).

Figure 11:
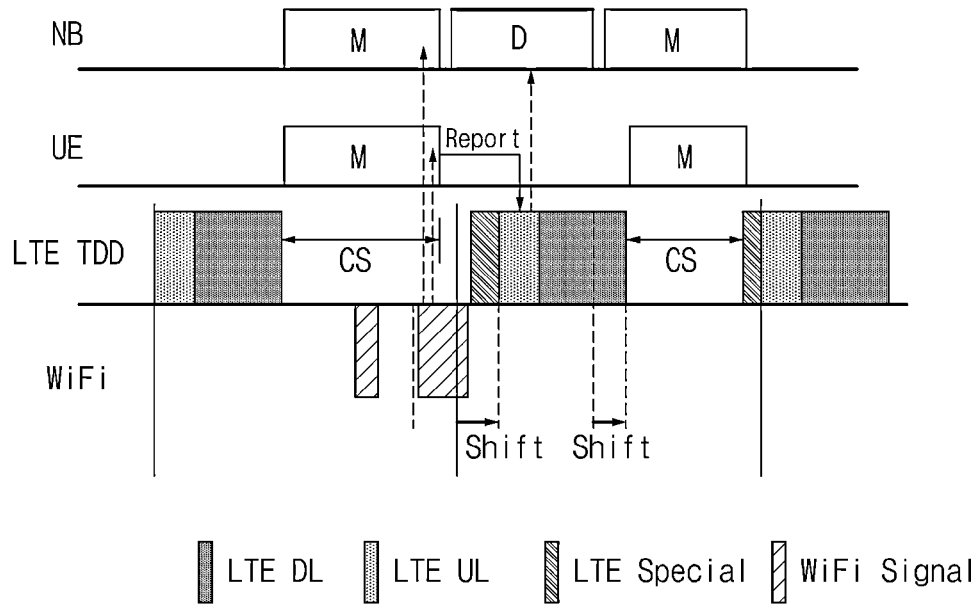
FIGS. 11 and 12 are diagrams for describing operation procedures of the terminal (UE) and the base station (NB) depending on detection of the WiFi signal in the wireless communication system of FIG. 8.
Figure 12:
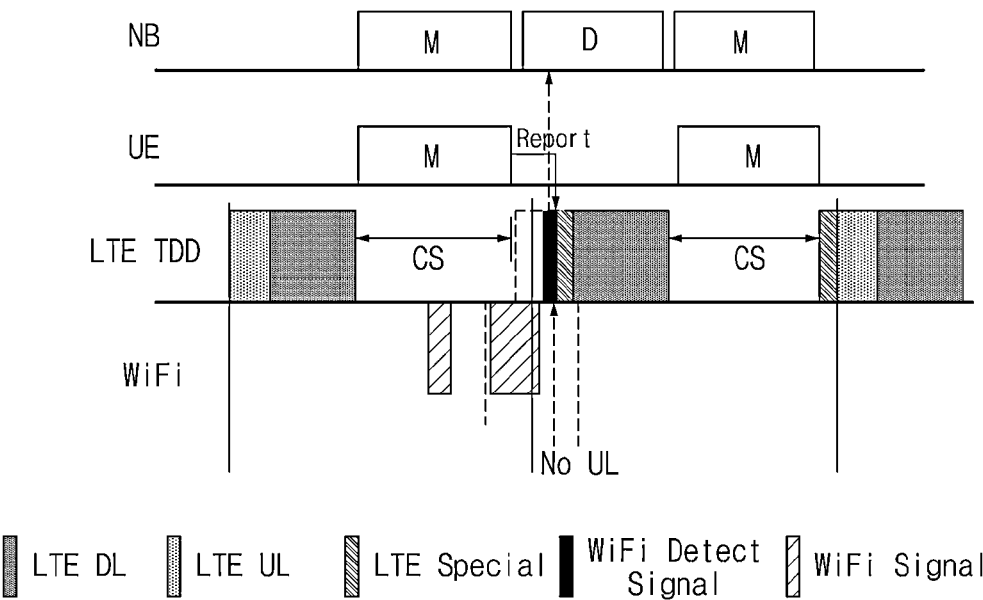

FIGS. 11 and 12 are diagrams for describing operation procedures of the terminal (UE) and the base station (NB) depending on detection of the WiFi signal in the wireless communication system of FIG. 8.

In step S11 of FIG. 9, when whether the WiFi emerges during the interval of the CS zone is measured, the WiFi signal is detected and when a WiFi signal level is measured with a predetermined threshold value or more just before the UpPTS or up to a predetermined time, the terminal (UE) does not transmit the UpPTS signal in the special subframe (SS) and the network is controlled depending on the scheduling decision and the dynamic resource allocation of the base station (NB) as the reporting unit 112 reports the corresponding WiFi emergence information to the base station (NB) as illustrated in FIGS. 11 and 12.

First, for example, when the measurement unit 111 of the terminal (UE) detects the WiFi emergence during the interval of the CS zone as described above, the terminal (UE) may shift the UL, the DL, or both sides (temporally) back after the special subframe (SS) together with shift of the special subframe (SS) after the WiFi signal is not detected in the corresponding frame and thereafter, decrease the CSs after the DL as many as the shifted subframes, as illustrated in FIG. 11.

That is, when the WiFi signal is not to be transmitted, the terminal (UE) may transmit the UpPTS during the interval of two or more symbols by the sample unit (Ts) as necessary in the SS shifted from the position of the special subframe (SS) which is previously allocated. That is, the terminal (UE) may repeatedly transmit the SRS or PRACH signal as the UpPTS signal during the interval of two or more symbols. In this case, when the reporting unit 112 of the terminal (UE) reports the WiFi emergence information through the UL after the shifted SS, the subframe scheduling unit 122 that recognizes (alternatively, recognizes the WiFi emergence) the shift of the special subframe (SS), and the like may dynamically allocate the resource according to the scheduling and apply the allocated resource to the subsequent frame after the corresponding frame elapses (e.g., apply the resource after approximately 10 msec) as illustrated in FIG. 10.

Alternatively, without reporting of the WiFi emergence information through the UL after the shifted SS and reduction of the CS as illustrated in FIG. 11, for example, as illustrated in FIG. 12, the reporting unit 112 of the terminal (UE) transmits the WiFi information (WiFi detection signal) to the base station (NB) in the shifted SS (is the position of the UL before the shift and the corresponding UL is detected), and as a result, the reporting unit 112 may notify the fact that the SS is shifted in addition to recognition of the WiFi emergence (alternatively, recognition of the SS shift) by measurement of the base station (NB) itself. In this case, the terminal (UE) may transmit the WiFi emergence information (WiFi detection signal) to the base station (NB) in addition to the SRS or PRACH signal during an UpPTS interval of which the length extends in the shifted special subframe (SS). As a result, the subframe scheduling unit 122 of the base station (NB) that recognizes the shift of the special subframe (SS), and the like (alternatively, recognizes the WiFi emergence) may dynamically allocate the resource according to the scheduling and apply the allocated resource to the subsequent frame after the corresponding frame elapses (e.g., apply the resource after approximately 10 msec).

Figure 13:
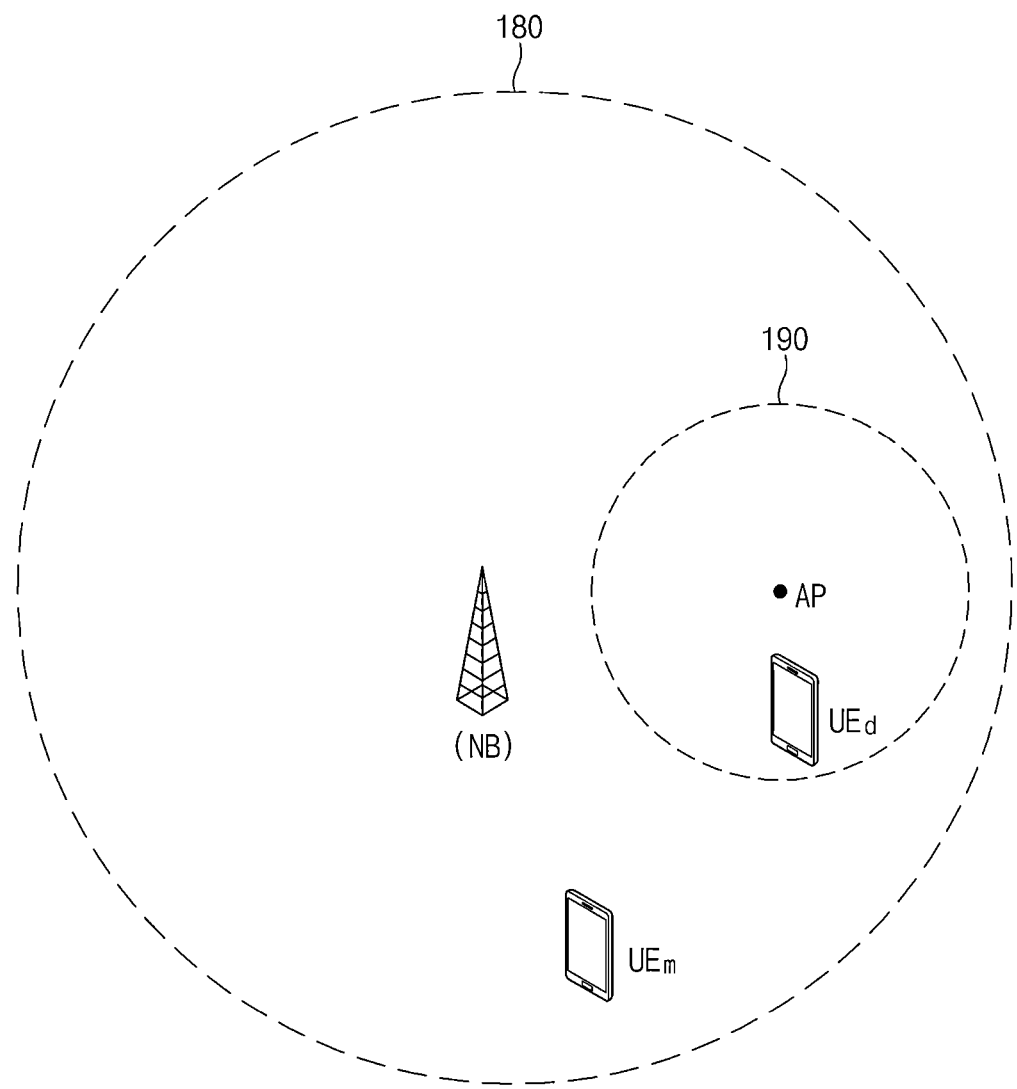
FIG. 13 is a diagram for describing the relationship between the terminal (UE) and the base station (NB) associated with recognition of shift of the special subframe (SS) or detection of the WiFi signal in the wireless communication system of FIG. 8.

In the wireless communication system of the present invention, as illustrated in FIG. 13, a terminal ($UE_m$) that may not detect the WiFi signal within service coverage 180 of the base station (NB) may recognize the shift of the special subframe (SS), and the like (alternatively, recognize the WiFi emergence) according to omission of a DL signal (non-transmission of a signal) of the base station (NB) which is preallocated, and even when the base station (NB) may not detect the WiFi signal, the base station (NB) may recognize the shift of the special subframe (SS), and the like (alternatively, recognize the WiFi emergence) through a terminal ($UE_d$) that detects the WiFi signal through determination by the base station (NB) itself or the methods of FIGS. 11 and 12.

For example, when the specific terminal ($UE_m$) may not detect the WiFi signal during a preallocated SS interval before the shift as illustrated in FIG. 13, a hidden node problem for the WiFi may occur, and as a result, the corresponding terminal ($UE_m$) may transmit the UpPTS signal during the SS interval after the shift, but since this signal is transmitted to some subcarriers, interference applied to the WiFi may be minimized. The specific terminal ($UE_m$) exists in the service coverage 180 of the base station, but may be a terminal that may not detect the WiFi signal outside coverage 190 of an access point (AP) of the WiFi system. Herein, when the DL is preallocated after the SS before the shift, since the base station (NB) may recognize the shift of the special subframe (SS), and the like (alternatively, recognize the WiFi emergence) through the terminal ($UE_d$) that detects the WiFi signal by the methods of FIGS. 11 and 12, the base station (NB) does not transmit preallocated corresponding DL, and as a result, the corresponding terminal ($UE_m$) may accordingly recognize the shift of the SS or the WiFi emergence. When the UL is preallocated after the SS before the shift, the corresponding terminal ($UE_m$) may transmit the signal, but the base station (NB) may disregard the signal transmitted from the $UE_m$ and the $UE_d$ may receive the SRS or PRACH signal transmitted in the SS after the shift.

For example, when the base station (NB) may not receive the SRS or PRACH signal in the SS before the shift in the case where the base station (NB) may not detect the WiFi signal, the base station (NB) (e.g., the subframe scheduling unit 122) may recognize the shift of the SS or the WiFi emergence. Herein, when the UL is preallocated after the SS before the shift, since the terminals ($UE_d$) that detect the WiFi signal does not transmit the signal to the physical uplink shared channel (PUSCH), the base station (NB) (e.g., the subframe scheduling unit 122) may recognize the shift of the SS or the WiFi emergence. The terminal $UE_d$ that detects the WiFi signal detects the WiFi signal within the coverage 190 of the AP of the WiFi system. Moreover, the shift of the SS or the WiFi emergence may be recognized through the WiFi emergence information (WiFi detection signal) transmitted by the $UE_d$ in the SS after the shift, or repeated SRS or PRACH. In the case where the DL is preallocated after the SS before the shift, when the base station (NB) may not recognize the WiFi emergence even by the SRS or PRACH which is omitted in the SS before the shift, the base station (NB) will transmit the DL after the corresponding SS, but in this case, the terminals may verify a situation in which the base station (NB) may not recognize the WiFi emergence and receive the DL after the shifted SS after a corresponding time stands by.

Meanwhile, FIG. 14 illustrates a diagram for describing a terminal (UE) and a base station (NB) of a wireless communication system 200 according to another exemplary embodiment of the present invention, which is used for operating both the unlicensed band TDD and the licensed band FDD described above and FIG. 15 is a flowchart for describing an operation of the wireless communication system 200 of FIG. 14.

Referring to FIG. 14, a device 210 for sharing the unlicensed band of the (mobile) terminal (UE) in the wireless communication system 200 according to another exemplary embodiment of the present invention may include a measurement unit 211 and a reporting unit 212, and a device 220 for sharing the unlicensed band of the base station (NB) may include a measurement unit 221 and a cross scheduling unit 222. Herein, the terminal (UE) includes mobile communication terminals including a smart phone, a tablet PC, and the like and in some cases, may include a desktop PC, and includes all electronic devices using a wireless communication scheme for sharing the unlicensed band of the present invention, which include a PMP, a PDP, and the like. The base station (NB) relays communication between the terminals (UEs) on a network supporting the wireless communication scheme of the present invention. General components for supporting wireless communication of the terminal (UE)

and the base station (NB) are not illustrated in FIG. 8 and only primary components are displayed and the respective components of the terminal (UE) or the base station (NB) may be implemented by hardware, software, or a combination thereof.

Figure 15:
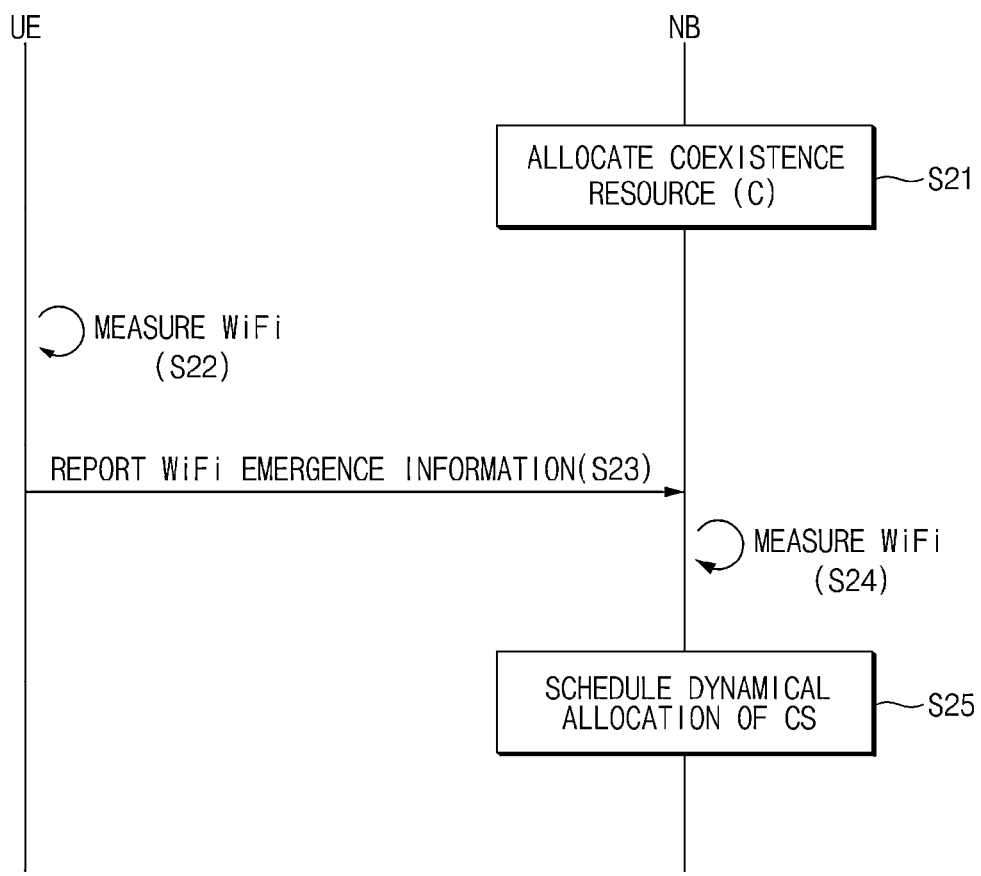
FIG. 15 is a flowchart for describing an operation of the wireless communication system of FIG. 14.

First, for example, as illustrated in FIGS. 16 and 17, the cross scheduling unit 222 of the base station (NB) allocates a coexistence resource (C) (e.g., PUSCH) as a resource for random access at a first subframe time of a FDD downlink frame (FDD DL) and an SS time of the unlicensed band TDD of an FDD uplink frame (FDD UL) (see S21 of FIG. 15). A time up to the coexistence resource (C) of the FDD UL from the coexistence resource (C) of the FDD DL is 4 msec or more. Herein, one frame of each of the FDD DL, FDD UL, and the unlicensed band TDD using channel resources of different frequencies may be the same period (e.g., 10 msec).

In this case, in order for the base station (NB) to dynamically control the resource while operating both the unlicensed band TDD and the licensed band FDD, the measurement unit 211 of the terminal (UE) measures whether the WiFi emerges (alternatively, the unlicensed band signal emerges) during the interval of the CS zone of the unlicensed band TDD (see S22 of FIG. 15) and when the WiFi signal is detected, the reporting unit 212 immediately reports predetermined WiFi emergence information (e.g., a predefined coded signal) to the base station (NB) through the coexistence resource (C) of the uplink frame (FDD UL) at the SS time of the TDD (see S23 of FIG. 15).

The measurement unit 221 of the base station (NB) may also measure whether the WiFi emerges of itself (see S24 of FIG. 15), and the cross scheduling unit 222 decides, based on the WiFi emergence information by the measurement unit 221 thereof and the WiFi emergence information reported by the terminal (UE), scheduling suitable therefor, however, dynamically grants the number of coexistence subframes (CSs) to accordingly control data to be transmitted and received (see S25 of FIG. 15). The cross scheduling unit 222 broadcasts the WiFi emergence situation to the terminals (UEs) by using a predetermined coded signal (e.g., a physical control format indicator channel (PCIFICH) through the coexistence resource (C) of the FDD downlink frame (FDD DL) at the first subframe time of the FDD downlink frame (FDD DL) and controls communication to be achieved through the shifted subframe as illustrated in FIGS. 11 and 12.

That is, even herein, as illustrated in FIG. 10, the subframe scheduling unit 122 decreases the number of coexistence subframes (CSs) when the WiFi emerges less and increases the number of the uplink subframes (ULs), the downlink subframes (DLs), or both subframes, and when the WiFi emerges more, a resource allocation process of increasing the number of coexistence subframes (CSs) and increasing the number of the uplink subframes (ULs), the downlink subframes (DLs), or both subframes may be dynamically performed. However, herein, since the cross scheduling scheme using the FDD and TDD resources is used, reporting through the TDD resource and allocation and control using the FDD resource (e.g., a UL frequency f1 and a DL frequency f2) are immediately performed without the need of a reporting time through a TDD resource (e.g., a frequency f3) and an execution time of the dynamic resource allocation process.

FIGS. 16 and 17 are diagrams for describing operating processes of the terminal (UE) and the base station (NB) depending on simultaneous operation of the licensed band FDD and the unlicensed band TDD in the wireless communication system of FIG. 13.

In step S22 of FIG. 15, when it is measured whether the WiFi emerges during the interval of the CS zone of the unlicensed band TDD, the WiFi signal is detected and when a WiFi signal level is measured with a predetermined threshold value or more just before the UpPTS or up to a predetermined time, the terminal (UE) does not transmit the UpPTS signal in the special subframe (SS) and the network is controlled depending on the scheduling decision and the dynamic resource allocation of the base station (NB) as the reporting unit 212 immediately reports the corresponding WiFi emergence information to the base station (NB) through the coexistence resource (C) of the uplink frame (FDD UL) at the SS time of the TDD as illustrated in FIGS. 16 and 17.

First, for example, when the measurement unit 211 of the terminal (UE) detects the WiFi emergence during the interval of the CS zone of the TDD as described above, the terminal (UE) may shift the UL, the DL, or both sides (temporally) back after the special subframe (SS) together with shift of the special subframe (SS) after the WiFi signal is not detected in the corresponding frame and thereafter, decrease the CSs after the DL as many as the shifted subframes, as illustrated in FIG. 16.

That is, when the WiFi signal is not to be transmitted, the terminal (UE) may transmit the UpPTS during an interval of two or more symbols by the sample unit (Ts) as necessary in the SS shifted from the position of the special subframe (SS) which is previously allocated. That is, the terminal (UE) may repeatedly transmit the SRS or PRACH signal as the UpPTS signal during the interval of two or more symbols. However, herein, when the reporting unit 212 of the terminal (UE) immediately reports the WiFi emergence information to the base station (NB) through the coexistence resource (C) of the uplink frame (FDD UL) at the SS time of the TDD before the shift, the cross scheduling unit 222 that recognizes the shift of the special subframe (SS), and the like correspondingly dynamically allocates the resource according to the scheduling as illustrated in FIG. 10. In this case, the cross scheduling unit 222 immediately notifies the WiFi emergence situation to the terminals (UEs) by using the predetermined coded signal (e.g., PCIFICH) through the coexistence resource (C) of the downlink frame (FDD DL) at the first subframe time of the FDD downlink frame (FDD DL) to allocate and control the resource immediately (without delaying one frame).

Alternatively, for example, as illustrated in FIG. 17, the terminal (UE) transmits the WiFi emergence information (WiFi detection signal) through the corresponding TDD channel resource (e.g., frequency f3) in the SS of the TDD (the UL position before the shift and the corresponding UL is deleted) shifted according to the scheduling of the scheduling unit 222 as described above, and as a result, the fact that the SS is shifted may be notified once again in addition to the reporting through the coexistence resource (C) of the uplink frame (FDD UL) at the SS time of the TDD before the shift and the recognition of the WiFi emergence (alternatively, the recognition of the SS shift) by the measurement by the base station (NB) itself. In this case, the terminal (UE) may transmit the WiFi emergence information (WiFi detection signal) to the base station (NB) in addition to the SRS or PRACH signal during an UpPTS interval of which the length extends in the shifted special subframe (SS). As a result, the cross scheduling unit 222 of the base station (NB) that recognizes the WiFi emergence immediately dynamically allocates and applies the resource according to the scheduling as illustrated in FIG. 10 to perform the control depending on the corresponding resource. In this case, the cross scheduling unit 222 immediately notifies the WiFi emergence situation to the terminals (UEs) by using the predetermined coded signal (e.g., PCIFICH) through the coexistence resource (C) of the downlink frame (FDD DL) at the first subframe time of the FDD downlink frame (FDD DL) to allocate and control the resource immediately (without delaying one frame).

When the WiFi emergence information (WiFi detection signal) is detected in the coexistence resource (C) of the FDD UL while the base station (NB) may not detect the WiFi signal, subframes between the SS before the shift and the SS after the shift of a preallocated TDD frame among the subframes of the unlicensed band TDD are disregarded until the SS is transmitted. In this case, when the disregarded subframe is the UL, some of the terminals (UEs) that may not detect the WiFi signal may transmit the corresponding signal, but may stop data transmission through FDD DL information. Further, when the disregarded subframe is the DL, since the base station (NB) may not transmit the DL signal, all terminals (UEs) may recognize a situation by the WiFi signal.

Configurations of the terminal (UE) and the base station (NB) of FIGS. 8 and 14 described above are preferably separately operated, but in some cases, the configurations of the terminal (UE) and the base station (NB) of FIGS. 8 and 14 are combined and coexistence of the unlicensed band of a self-scheduling scheme using only the TDD frame and coexistence of the unlicensed band of the cross scheduling scheme simultaneously using the TDD frame and the FDD frame may be selectively operated according to a predetermined decision scheme.

The specified matters and limited exemplary embodiments and drawings such as specific components in the present invention have been disclosed for illustrative purposes, but are not limited thereto, and those skilled in the art will appreciate that various modifications and changes can be made in the art to which the present invention belongs, within the scope without departing from an essential characteristic of the present invention. For example, the present invention has been described even above by using the TDD/FDD frame structure as an example, but the present invention may be similarly applied and used even in the data frame structure of not the TDD/FDD but various schemes, and the present invention has been described even above by using the LTE/WiFi system as an example in the coexistence system of the present invention as described even above, the present invention may be similarly applied and used even for coexistence between not the LTE/WiFi system but communication systems of various different schemes. The spirit of the present invention is defined by the appended claims rather than by the description preceding them, and the claims to be described below and it should be appreciated that all technical spirit which are evenly or equivalently modified are included in the claims of the present invention.

What is claimed is:

1. An operation method of a terminal in a wireless communication system for using an unlicensed band, comprising:
   generating an uplink data unit; and
   transmitting, to a base station included in the wireless communication system, the uplink data unit using a frame of the unlicensed band,
   wherein the frame includes an uplink subframe (UL) zone, a downlink subframe (DL) zone, a special subframe (SS) for channel estimation and synchronization, and a coexistence subframe (CS) zone for coexistence use with an unlicensed band system,
   the uplink data unit is transmitted using at least one of the uplink subframe (UL) zone and the coexistence subframe (CS) zone, and
   the coexistence subframe (CS) is located ahead of the special subframe (SS) to use the special subframe as intervals of a downlink pilot time slot (DwPTS) in which the base station transmits no signal, a guard period (GP), and an uplink pilot time slot (UpPTS).

2. The method of claim 1, wherein the wireless communication system includes an LTE system using a licensed band and the unlicensed band system includes a WiFi system.

3. The method of claim 1, wherein the number of coexistence subframes (CSs) and the number of uplink subframes (ULs) or downlink subframes (DLs) are flexibly allocated depending on resource occupation of the unlicensed band system.

4. The method of claim 1, wherein a length of an UpPTS interval of the special subframe (SS) varies depending on existence of an unlicensed band signal, and the UpPTS interval of the special subframe (SS) is used to transmit an unlicensed band system detection signal, in addition to signal transmission for channel estimation and uplink synchronization to allow the unlicensed band system to determine that a resource is occupied depending on the variation of the length or the unlicensed band system detection signal.

5. The method of claim 1, wherein when the number of downlink subframes (DLs) is smaller than the number of uplink subframes (ULs) of a subsequent frame, grant is made to a plurality of uplink subframes (ULs) of the subsequent frame by any one downlink subframe (DL).

6. The method of claim 1, wherein hybrid auto repeat request (HARQ) feedback is made to a plurality of uplink subframes (ULs) in a bundling or multiple format in one downlink subframe (DL) of a subsequent frame corresponding to the plurality of uplink subframes (ULs).

7. The method of claim 1, wherein when the number of downlink subframes (DLs) is larger than the number of uplink subframes (ULs) in the corresponding frame, HARQ feedback is made to a plurality of downlink subframes (DLs) of a previous frame in a bundling or multiple format by any one uplink subframe (UL).

8. An unlicensed band coexistence method in a wireless communication terminal, the method comprising:
   transmitting data using a frame including a coexistence subframe (CS) zone for coexistence use with an unlicensed band system ahead of a special subframe (SS);
   detecting an unlicensed band system signal in a DwPTS and GP intervals of the special subframe (SS); and
   transmitting a UpPTS signal at a position of a corresponding special subframe (SS) moved to a subsequent subframe position, when the unlicensed band system stops the resource occupation in the DwPTS and GP intervals, after the detecting,
   wherein the UpPTS signal includes a sounding reference signal (SRS), a PHY random access channel (PRACH) signal, or an unlicensed band system detection signal, with a length of "natural number*symbol length+cyclic prefix (CP) insertion length+$\alpha$*Ts" by a sample unit (Ts) as sample unit time offset $\beta$*Ts, where $\alpha$ and $\beta$ are 0 or the natural number.

9. The method of claim 8, wherein when the unlicensed band system signal is continuously detected up to a subsequent subframe by starting ahead of a special subframe of a previous subframe, the unlicensed band system detection signal is transmitted in a sample data format determined by the sample unit (Ts) up to a remaining boundary time of the subsequent subframe.

10. An unlicensed band coexistence method for data transmission and reception in a wireless communication system, the method comprising:
- detecting, by a terminal, an unlicensed band signal during a coexistence subframe (CS) zone included in a data frame to report information on emergence of the unlicensed band signal to a base station; and
- dynamically allocating, by the base station that communicates with the terminal, shift of subframes of the data subframe or the number of subframes during a scheduling process, according to information on the emergence of the unlicensed band signal detected during the coexistence subframe (CS) zone interval of itself or information on the emergence of the unlicensed band signal reported by the terminal,
- wherein the allocating includes recognizing and processing the shift of an uplink subframe (UL) or a downlink subframe (DL) of the data frame after the emergence of the unlicensed band signal and dynamically allocating the number of coexistence subframes (CSs), uplink subframes (ULs), or downlink subframes (DLs) of a subsequent data frame.

11. The method of claim 10, wherein the reporting includes reporting the unlicensed band signal emergence information to the base station through the uplink subframe (UL) at a shifted position when the detection of the unlicensed band signal stops in addition to reduction of the coexistence subframe (CS) of a preallocated subsequent data frame or disregarding the uplink subframe (UL) and reporting the unlicensed band signal emergence information to the base station through a special subframe (SS) shifted to the position of the uplink subframe (UL).

12. A device for sharing an unlicensed band of a wireless communication terminal, the device comprising:
- a measurement unit measuring whether an unlicensed band signal emerges during a coexistence subframe (CS) zone interval included in a data frame; and
- a reporting unit reporting an unlicensed band signal emergence information to a base station through an uplink subframe (UL) at a shifted position when detection of the unlicensed band signal stops in addition to reduction of the coexistence subframe (CS) of a preallocated subsequent data frame or disregarding the uplink subframe (UL) and reporting the unlicensed band signal emergence information to the base station through a special subframe (SS) shifted to the position of the uplink subframe (UL), depending on the detection of the unlicensed band signal in the measurement unit.

13. A device for sharing an unlicensed band of a base station, the device comprising:
- a measurement unit measuring whether an unlicensed band signal emerges during a coexistence subframe (CS) zone interval included in a data frame; and
- a subframe scheduling unit deciding scheduling of a channel resource according to information on the emergence of the unlicensed band signal from the measurement unit or information on emergence of the unlicensed band signal reported from a wireless communication terminal that communicates with the base station, and recognizing and processing shift of the uplink subframe (UL) or a downlink subframe (DL) of the data frame after the emergence of the unlicensed band signal and dynamically allocating the number of coexistence subframes (CSs), uplink subframes (ULs), or downlink subframes (DLs) of a subsequent data frame.

14. A method for sharing an unlicensed band in a wireless communication system that transmits and receives data by simultaneously operating different data frames, the method comprising:
- detecting, by a terminal, an unlicensed band signal during a coexistence subframe (CS) zone interval included in a first data frame to report information on emergence of the unlicensed band signal to a base station through a coexistence resource (C) of an uplink frame of a second frame; and
- dynamically allocating, by a base station that communicates with the terminal, shift of subframes of a first subframe or a number of subframes during a scheduling process, according to information on the emergence of the unlicensed band signal detected during the coexistence subframe (CS) zone interval of itself or information on the emergence of the unlicensed band signal reported by the terminal.

15. The method of claim 14, wherein in the reporting,
- the information on the emergence of the unlicensed band signal is reported to the base station through the coexistence resource (C) of the uplink frame of the second frame at a time of a special subframe (SS) of a first frame, and
- the emergence of the unlicensed band signal is broadcasted to the terminal through the coexistence resource (C) of a downlink frame of the second frame at a first subframe time of the downlink frame of the second frame.

16. The method of claim 14, wherein the allocating includes recognizing the shift of an uplink subframe (UL) or a downlink subframe (DL) in the first data frame subsequent after the emergence of the unlicensed band signal and dynamically allocating the number of coexistence subframes (CSs), uplink subframes (ULs), or downlink subframes (DLs) of the corresponding first frame.

17. A device for sharing an unlicensed band in a wireless communication terminal that transmits and receives data by simultaneously operating different data frames, the device comprising:
- a measurement unit measuring whether an unlicensed band signal emerges during a coexistence subframe (CS) zone interval included in a first frame; and
- a reporting unit reporting information on the emergence of the unlicensed band signal to a base station through a coexistence resource (C) of an uplink frame of a second frame at the time of a special subframe (SS) of the first frame or disregarding an uplink subframe (UL) of the first frame and reporting the unlicensed band signal emergence information to the base station through a first resource in the special subframe (SS) shifted to the position of the uplink subframe (UL), depending on the detection of the unlicensed band signal in the measurement unit.

18. A device for sharing an unlicensed band in a base station that transmits and receives data by simultaneously operating different data frames, the device comprising:
- a measurement unit measuring whether an unlicensed band signal emerges during a coexistence subframe (CS) zone interval included in a first frame; and
- a cross scheduling unit deciding scheduling of a channel resource according to information on the emergence of the unlicensed band signal from the measurement unit or information on emergence of the unlicensed band signal reported from a wireless communication terminal that communicates with the base station through a coexistence resource (C) of an uplink frame of a second frame, and recognizing shift of an uplink subframe (UL) or a downlink subframe (DL) in a first frame subsequent after the emergence of the unlicensed band signal and dynamically allocating the number of coexistence subframes (CSs), uplink subframes (ULs), or downlink subframes (DLs) of the corresponding first frame.

* * * * *